United States Patent
Järvekülg et al.

(10) Patent No.: US 8,597,610 B2
(45) Date of Patent: Dec. 3, 2013

(54) METHOD FOR PREPARING OXIDE MATERIAL

(75) Inventors: Martin Järvekülg, Viljandi (EE); Valter Reedo, Tartu (EE); Uno Mäeorg, Tartu (EE); Ilmar Kink, Tartu (EE); Ants Lõhmus, Tartu (EE)

(73) Assignees: Estonian Nanotechnology Competence Centre, Tartu (EE); University of Tartu, Tartu (EE)

( * ) Notice: Subject to any disclaimer, the term of this patent is extended or adjusted under 35 U.S.C. 154(b) by 760 days.

(21) Appl. No.: 12/663,179

(22) PCT Filed: Jun. 9, 2008

(86) PCT No.: PCT/EE2008/000016
§ 371 (c)(1),
(2), (4) Date: Dec. 4, 2009

(87) PCT Pub. No.: WO2008/148399
PCT Pub. Date: Dec. 11, 2008

(65) Prior Publication Data
US 2010/0183829 A1    Jul. 22, 2010

(30) Foreign Application Priority Data
Jun. 7, 2007 (EE) .................................. 200700029

(51) Int. Cl.
*B32B 1/08* (2006.01)
*B29C 37/00* (2006.01)

(52) U.S. Cl.
USPC .......................... 423/608; 428/34.1; 264/134

(58) Field of Classification Search
USPC .......................... 428/34.1; 264/134; 423/608
See application file for complete search history.

(56) References Cited

U.S. PATENT DOCUMENTS

| 5,106,828 | A | * | 4/1992 | Bhargava et al. | 505/440 |
| 6,027,775 | A | | 2/2000 | Kasuga et al. | |
| 6,537,517 | B1 | | 3/2003 | Kasuga et al. | |

FOREIGN PATENT DOCUMENTS

| EP | 1 557 396 A2 | 7/2005 |
| EP | 1 748 033 A1 | 1/2007 |
| JP | 09110452 A * | 4/1997 |

OTHER PUBLICATIONS

Schubert (Hybrid Inorganic-Organic Materials by Sol-Gel Processing of Organofunctional Metal Alkoxides, Chem. Mater., 1995, 7, 2010-2027).*
Machine translation of Yokoi (JP09-110452).*
Machine translation of Loutchnikow (EP1557396).*

(Continued)

*Primary Examiner* — Jun Li
(74) *Attorney, Agent, or Firm* — Birch, Stewart, Kolasch & Birch, LLP

(57) ABSTRACT

In the current invention a method for the preparation of an oxide material was described that involves bringing the sol onto the substrate, the gelation of the solution and thermal treatment of the gel. Alkoxides are used as precursor materials for the sol preparation and substrate free structures are employed for the manufacturing of the oxide material. A gel film with thickness ranging from 5 nm to 1 µm is created onto the sol layer. The gelled film is separated into pieces by self organizing and the gelled part is disconnected from the substrate. Substrate free tubular structures with diameters ranging from 0.01-100 µm are formed of the gel film which are then heated at temperature range of 200-1600 C during a period of 5 minutes to 10 hours. The manufactured oxide materials are employed as catalysts, gas sensors, stationary phases of chromatographic columns, composite materials, thermal isolation materials and micro- or nano electronic mechanical systems (MEMS or NEMS) components.

15 Claims, 2 Drawing Sheets

Background Art

(56) References Cited

OTHER PUBLICATIONS

Prinz et al., "Free-standing and overgrown InGaAs/GaAs nanotubes, nanohelices and their arrays", Physica E, 6 (2000) p. 828-831.

Luchnikov et al., "Self-Rolled Polymer and Composite Polymer/Metal Micro- and Nanotubes with Patterned Inner Walls", Adv. Mater., 17 (2005) p. 1177-1182.

Kasuga et al., "Formation of Titanium Oxide Nanotube", Langmuir, vol. 14, No. 12 (1998) p. 3160-3163.

Yamane et al. "Thick Silicate Glass Film by an Interfacial Polymerization", Journal of Sol-Gel Science and Technology 2, (1994) p. 457-460.

* cited by examiner

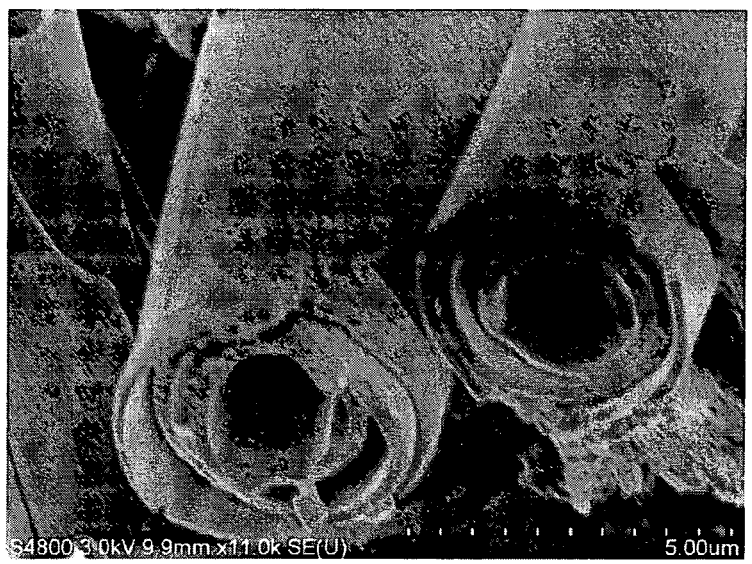
FIG 2
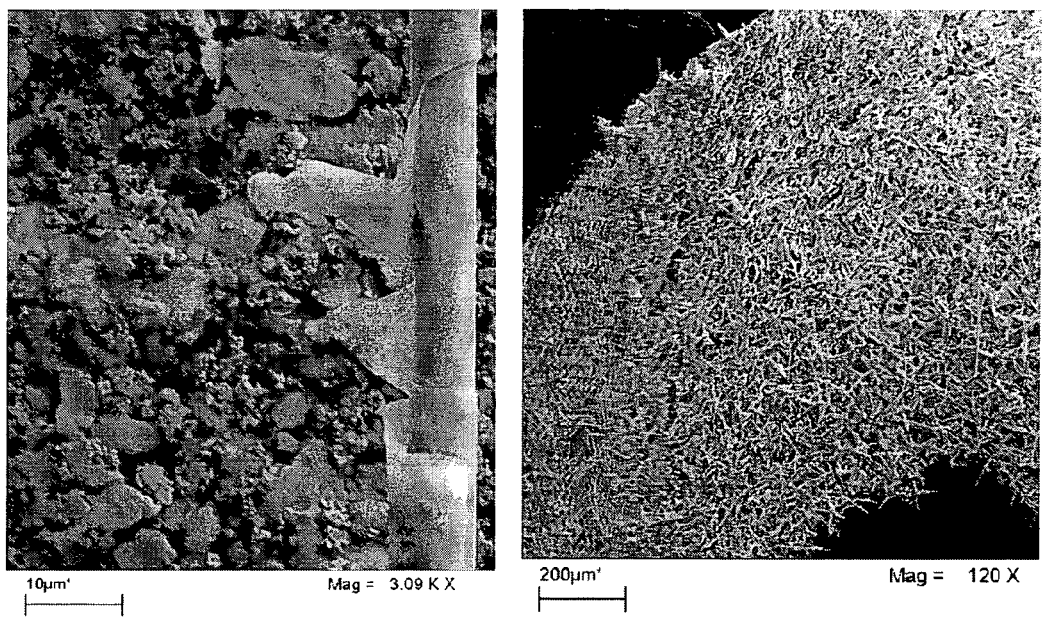
FIG 3
FIG 4

METHOD FOR PREPARING OXIDE MATERIAL

TECHNICAL FIELD

The present invention belongs to the field of nanotechnology, more specifically to the field of preparing nanofilms and manufacturing of nano- and micro scale tubular structures of these films.

BACKGROUND ART

Previously, sol-gel methods have been developed to fabricate thin films, fibres, monoliths, spherical particles and various other structures prepared by coating structures with a gel film layer. Furthermore, micro- and nanotubes have been produced by covering structures with a gel film layer. Micro- and nanotubes have been fabricated from various oxide materials such as: ZnO, $TiO_2$, $SnO_2$, $Pb_3O_4$, $CeO_2$, $V_2O_3$, NiO, rare earth metal oxides, $SiO_2$ and $Na_2W_2O_7$. Oxide micro- and nanotubes are principally prepared by coating a suitable structure (fibre or membrane) with a sol layer which is followed by gelation, thermal treatment and removal of the template.

A method is known for the manufacturing of tubular structures where mechanical stresses are induced due to the difference of material composition of the multiple-layered film structure deposited on a substrate. Such methods require specific deposition chambers such as vapour-phase deposition, molecular epitaxy (Prinz, V. Ya., Seleznev, V. A., Gutakovsky, A. K., Chehovckiy, A. V., Preobrazhenskii, V. V., Putyato, M. A., Gavrilova, T. A., Free-standing and overgrown InGaAs/GaAs nanotubes, nanohelices and their arrays., Physica E, 6 (2000)) or in case of polymeric materials dip-coating or spin-coating techniques are utilized (Luchnikov, V., Sydorenko, O., Stamm, M., Self-Rolled and Composite Polymer/Metal Micro- and Nanotubes with Patterned Inner Walls, Adv. Mater, 17 (2005))).

Afterwards, the films are cut into suitable size employing methods that require specific apparatus such as electron beam-, ion beam- or optical lithography. The film is released from the substrate by selective etching and the induced stress gradient causes the film to form a tubular structure. This method has been applied for producing micro- and nanotubes of various semi-conducting materials such as SiGe/Si, InGaAs/GaAs (Prinz, et al, 2000), In/Al/GaAs/InAs (Prinz, et al, 2000), InGaP, SiGe/Si/Cr, SiGe/Si/SixNy/Cr.

Titanium oxide nanotubes have been fabricated with a method described in the work of T, Hiramatsu, M., Hoson, A., Sekino, T., Niihara, K., Formation of titanium oxide nanotube. Langmuir, 14(12) (1998). Suitable crystal oxide materials or materials produced via the sol-gel route are employed as starting materials for this method. The starting material powder is treated with a base (e.g. NaOH) solution and then with an acidic (e.g. HCl) solution. The washing results in $TiO_2$ nanotubes. Such $TiO_2$ materials have the advantage over bulk $TiO_2$ that they have a higher photocatalytic activity and therefore such materials are employed for purification of the environment from toxic gases, decomposition of carboxylic acids or production of hydrogen. As a biomaterial it is applicable in implants as it is compatible with the tissues of living organisms. In addition such materials are potentially applicable in solid electrolytes and fuel elements.

Comparable solutions to the current invention are the United State patents U.S. Pat. No. 6,537,517 (Crystalline titania having nanotube crystal shape and process for producing the same) and U.S. Pat. No. 6,027,775 (Crystalline titania and process for producing the same), which describe the processing of crystal titanium oxide powders with a basic solution that results in the formation of nanometre sized sheets that self-similarly form tubular structures.

The European patent EP1557396A2 can be considered the closest solution to the current invention. A multiple layered polymer structure is transformed on a surface and with the addition of solvent to one layer a change of volume induced. An intrinsic gradient of some physical-chemical or chemical property induces a volume change gradient in the material which causes the rolling of the film structure.

Similarly, microtubes of semi-conducting materials are fabricated. The film structures are deposited of materials that intrinsically exhibit stress at the common interface (V. Y. Prinz, V. A. Seleznev, A. K. Gutakovsky, A. V. Chehovskiy, V. V. Preobrazhenskii, M. A. Putyato, T. A. Gavrilova, "Free-standing and overgrown InGaAs/GaAs nanotubes, nanohelices and their arrays," Physica E 6, 828-831 (2000).). The key stage of the described methods is the removal of the film structure by selectively etching the specific layer composed of another material from between the substrate and the film.

Another similar solution is the method for preparing a sol film on the surface of water. A selfstanding gel film is obtained that does not self-similarly form a tubular structure (M. Yamame, S. Shibata, A. Yasumori, T. Yano, S. Uchihiro, "Thick silicate glass film by an interfacial polymerization," J. Sol-Gel Sci. Technol. 2, 457-460 (1994).). By employing a non-template method the fracturing of the materials due to contraction at gelation is avoided.

Although the field of application of oxide materials is extremely wide and metal oxides such as $ZrO_2$, $HfO_2$ and $TiO_2$ are produced yearly in tonnes, the shortcoming of the known inventions is the complex and costly technological process. The utmost deficiency of solutions for oxide materials in certain fields (e.g. catalysis, thermo-isolation at high temperatures or high pressures) is the extremely high cost of the materials and products made thereof.

DISCLOSURE OF THE INVENTION

The aim of the current invention is to propose compared to the known-to-date methods a more effective and cost-efficient method for preparing oxide materials, preferably tubular, micro- and nanotube structures. Tubular structures of $ZrO_2$, $HfO_2$, $TiO_2$ or other metal oxides are prepared via the sol-gel route as described in the invention. The method is applicable in laboratory conditions as well as in small- and large-scale industrial production.

The materials produced as described therein have compared to bulk materials a higher specific surface area thus allowing the materials to be employed as sensor-materials or in catalytic processes. The high melting point (>2700° C.) of $HfO_2$ and $ZrO_2$ enables to utilizes these materials at high temperature catalysis. Tubular structures of $ZrO_2$, $HfO_2$ and $TiO_2$ are applicable in composite materials; furthermore, they can be used as starting material for carbides.

The advantage of the present invention is the technological simplicity of the method for producing oxide materials which does not require large investments. The main difference compared to inventions known up-to-date (FIG. 1 depicts the sol-gel methods for preparing various materials with examples) is the self organizing nature of the films due to stresses induced by fracturing at gelation which significantly simplifies and reduces the costs for various applications. In addition the current invention reduces the costs per unit mass for large-scale production as it is applicable as a cyclic production process without the need for specific and expensive devices. The known technologies for producing film via the sol-gel route are depicted on FIG. 1. Their main disadvantage is that for the preparation of such nanotubes a suitable template structure is needed.

In the method described herein during gelation a stress gradient is induced in the gel and the mechanical stresses of different direction and dimension cause the oxide material to roll into a tube-like structure that exist without a solid substrate.

Sols of alkoxides or alkoxide mixtures that consist of a polymerizable materials of at least 5% and are hydrolyzed to the extent of 80% are used as precursor materials for manufacturing the oxide film structures. 95% of the sol consists of an organic solvent such as alkanes (e.g. hexane) or mixtures of alkanes. The sol is deposited on the substrate (e.g. the bedplate, wall of the reactor etc) so that a sol film with thickness of at least 5 nm is obtained.

Thereafter in the timeframe of 1 s up to 10 days, preferably ~5 min an amount of 0.0001-900 g/m$^3$, preferably 10-20 g/m$^3$ of humid gas (air, argon, helium) is conducted over the sol surface. The H$_2$O present in the gas causes the gelation of the surface layer of the sol. The relative humidity of the gas should be around 5-100%, preferably between 80-95% as the water content determines the velocity of gelation and the thickness of the obtained layer. Water content of below 5% is technologically not feasible and above 95% there exists a possibility of water condensation on the elements of the reactor chamber which is undesirable. A gel film with thickness of 5-800 nm is obtained. The use of a thinner layer requires a more complicated gas flow control apparatus and an even longer exhibition period to the moist gas is technologically not justified. Layers below 5 nm are formed only of ~10 atomic layers are mechanically non-stable and films thicker than 800 nm are too stiff for self-rolling.

The gel film contracts and fractures, the resulting film pieces' surface area is in the range of 2 μm$^2$-5 mm$^2$, being in the range of 70%+/−10% in the half-width region of the normal distribution. The smaller gel pieces form a nanopowder and can be separated from the final product.

The sol layer between the gel film and the substrate is then dissolved in an organic solvent such as an alkane (e.g. hexane) and the gel film pieces are brought into the solution. The amount of the organic solvent or mixture thereof must exceed the amount of the gel at least 2 times. The release of the gel film from the substrate causes a stress tensor that leads to the rolling of the gel film and formation of tubular like structures with diameter in the range of 0.01-100 μm.

The minimal diameter of the tubular structures is determined by the balance of repulsive and attractive interactions of atoms. The upper limit causes the film to bend and a radial part of the tube is obtained.

The tubular structures can be oxidized by heating in the temperature range of 200-1600° C. and a period of 5 min to 10 hours.

BRIEF DESCRIPTION OF DRAWINGS

The method of the current invention is described in more detail in the following examples of realization with references to the added images, where

FIG. 2 shows the cross-sectional view of the tubular structures obtained by the method illustrated on FIG. 1;

FIG. 3 shows the side view of the tubular structures obtained by the method illustrated on FIG. 1;

FIG. 4 shows the oxide material obtained from the tubular structures illustrated on FIGS. 2 and 3.

DESCRIPTION OF EMBODIMENTS

Figure 1:
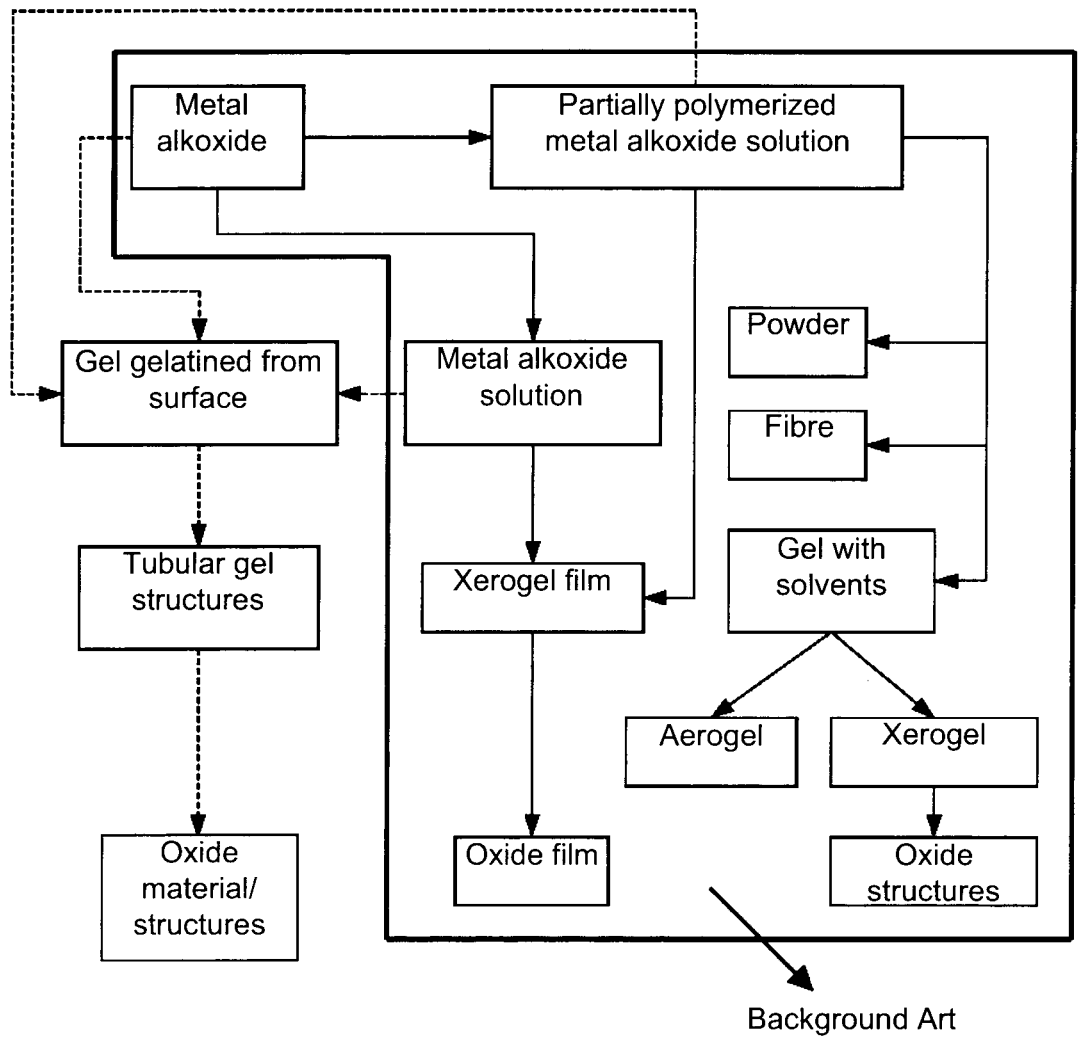
FIG. 1 shows the technical background art which is surrounded by the gross line and the block scheme of the utilized method which is denoted with the dotted line.

The well-known sol-gel method is based on the phenomena that hydrolyzed alkoxide molecules agglomerate (e.g. metal alkoxides) thus resulting in a polymerized structure. Aggregation of the sol particles is induced with the addition of gaseous water. By controlling the process parameters the associative addition is run so that the obtained film would have one branched polymer molecule extending to its whole volume. Such a structure accounts for the stability of the material.

According to the current invention:
the sol is brought onto the substrate;
the sol is partially gelled;
at the sol surface a gel film with thickness of 5-1000 nm is obtained during gelation;
the gelled film is distributed into parts by self organizing;
the sol part is removed;
the gel film obtained by gelation is disconnected from the substrate;
from the gel film tubular structures are formed with diameter ranging from 0,01-100 μm;
the structures are filtered from the solution;

In the current method alkoxides, preferably metal alkoxides are used as starting materials for the preparation of the sol. A solution is made of the unhydrolyzed or of up to 50% hydrolyzed alkoxide (preferably pure alkoxides are used) in an organic solvent to obtain the sol.

The excess of 50 times (mass) of the organic solvent (hexane, butanol) is used for the preparation of the alkoxide solution. The alkoxide concentration is 1-80 wt %. Ethoxide, methoxide, propoxide, butoxide or various mixtures thereof are used for the preparation of the sol. Hafnium, zirconium, tin, aluminium; silicon, nickel, manganese, yttrium, cerium, praseodymium, neodymium, samarium, europium, gadolinium, terbium, dysprosium, holmium, erbium, ytterbium or various mixtures of metal alkoxides are used as the metal of the alkoxide.

The sol is brought to the surface (preferably on the inner surface of the vessel, inner or outer surface of a cylinder or a surface of any other shape) by dip-coating, spin-coating or spraying so that a thin film would form on the surface of the sol.

Afterwards the hydrolysis of the sol is carried out by streaming a moist gas (e.g. air) over the surface of the obtained sol or a humid gaseous atmosphere is created above the sol surface (e.g. air or any other humid gas). As a result of the contact of the sol surface with the humid gas hydrolysis and polymerization occur and thus the gelation of the surface layer of the sol leads to the formation of a thin film which composes of the same polymerized material. The upper limit for the thickness of the obtained film material is determined by the size and shape of the vessel. It has to be calculated that the sol layer brought onto the surface of the vessel is thicker than the obtained gel film material. A sol layer is left between the gel material and the substrate. That layer can be dissolved preferably in an organic solvent (e.g. hexane) but the gel material must be insoluble in the used solvent.

Supplementing of the organic solvent to the composition acquired by the current method that consist of the gel layer on the sol layer the sol is removed from beneath the gel layer. The solvent is added to the composition downwards from the side of the gel film layer which causes the material to shrink thus the resulting gelation leads to fracturing of gel into pieces.

Such self organizing causes cracks in the gel layer that enable the solvent to reach the sol phase. The tubular structures are self-formed from the gel pieces within the obtained sol solution.

The thickness of the oxide film materials manufactured by the current method is in the range of 10-500 nm. The tubular film material structures prepared according to the method have diameters ranging from 0.01-100 μm.

The nethermost limit of the surface area of the piece of film is determined with the case of the gel film separating in powder particles (starting from tens of atoms) and the upper limit by one single slit through the gelled film.

In the above described example, according to the current method the rolling of the films is caused by stress gradient induced during gelation. On the other hand in the case of thinner films (some atomic layers) the rolling at the removal of the sol is induced by the saturation of the unsaturated bonds at the boundaries of the film.

The maximum thickness of oxide material that will still roll is determined by the thickness of the gelled layer. The rigidness of the gelled layer should not exceed the stresses induced by the gradient of the extent of gelation.

The tubular structures can be oxidized by heating at a temperature range of 200-1600° C. during a period of 5 to 600 minutes. The gelation processes can be carried out differently depending on the precursor material and composition parameters. The local stresses in the gel film determine the radius of curvature of the rolled film.

The oxide material prepared by the method described herein is applicable for manufacturing catalysts, gas sensors, stationary phases of chromatographic columns, composite materials, pharmaceutical carriers, thermal isolation materials and micro- or nano electronic systems (MEMS or NEMS) components.

The invention claimed is:

1. A method for preparing tubular oxide material structures, comprising the steps of:
    bringing a sol onto a substrate, wherein alkoxide precursors are used for the source of the sol;
    gelation of a surface of the sol by forming a gel film of 5 nm to 1 μm on the surface of the sol during the gelation, wherein the gel film formed onto the sol contracts, fractures, and separates to pieces with a controlled surface area by self-organizing;
    adding a solvent to dissolve a sol layer between the gel film and the substrate, removing the gel film pieces from the substrate, and bringing the gel film pieces into a solution, whereby by releasing the gel film pieces from the substrate, freestanding tubular oxide material structures with diameters ranging from 0.01-100 μm are formed; and
    oxidizing the tubular oxide material structures by heating;
    wherein cracking and formation of slits in the gel film cause the self-organizing separation into pieces.

2. The method according to claim 1, wherein the gel film is formed by partial gelation of the surface of the sol by exposing it to humid gas 0.0001-900 g/m$^3$ during a period of 1 second to 10 days.

3. The method according to claim 1, wherein a pure alkoxide or an alkoxide that is hydrolyzed up to 50% is used for preparing of the sol.

4. The method according to claim 3, wherein a pure alkoxide is dissolved in an organic solvent with 1:50 mass ratio for preparing of the sol.

5. The method according to claim 4, wherein ethoxide, methoxide, propoxide, or butoxide are used for preparing of the sol.

6. The method according to claim 3, wherein ethoxide, methoxide, propoxide, butoxide or various mixtures thereof are used.

7. The method according to claim 1, wherein Hafnium, zirconium, tin, aluminium, silicon, nickel, manganese, yttrium, cerium, praseodymium, neodymium, samarium, europium, gadolinium, terbium, dysprosium, holmium, erbium, ytterbium or various mixtures of metal alkoxides are used as the metal of the alkoxide.

8. The method according to claim 3, wherein Hafnium, zirconium, tin, aluminium, silicon, nickel, manganese, yttrium, cerium, praseodymium, neodymium, samarium, europium, gadolinium, terbium, dysprosium, holmium, erbium, ytterbium or various mixtures of metal alkoxides are used as the metal of the alkoxide.

9. The method according to claim 2, wherein the relative humidity of the used gas is between 5-100%.

10. The method according to claim 9, wherein the relative humidity of the used gas is between 80-95%.

11. The method according to claim 1, wherein an organic solvent or mixture of organic solvents is added to the gel in an amount ratio that exceeds 2:1.

12. The method according to claim 2, wherein the surface of the sol is flushed with a humid gas during a period of 1 to 60 minutes.

13. The method according to claim 12, wherein the surface of the sol is flushed with humid air preferably during a period of 5 minutes.

14. The method according to claim 11, wherein the surface of the sol is flushed with humid air in an amount of 10-20 g/m$^3$.

15. The method according to claim 4, wherein the organic solvent is hexane or butanol.

* * * * *